(12) United States Patent
Cotton

(10) Patent No.: US 7,398,643 B2
(45) Date of Patent: Jul. 15, 2008

(54) COMBINED EGR COOLER AND PLASMA REACTOR

(75) Inventor: James Scott Cotton, Burlington (CA)

(73) Assignee: Dana Canada Corporation, Ontario (CA)

( * ) Notice: Subject to any disclaimer, the term of this patent is extended or adjusted under 35 U.S.C. 154(b) by 122 days.

(21) Appl. No.: 11/383,552

(22) Filed: May 16, 2006

(65) Prior Publication Data

US 2007/0266702 A1 Nov. 22, 2007

(51) Int. Cl.
*F01N 3/00* (2006.01)

(52) U.S. Cl. .............................. 60/275; 60/274; 60/298; 60/320; 60/321; 422/186.03; 422/186.11; 422/186.15; 422/186.19; 422/186.2; 422/186.22; 165/52; 165/66; 165/DIG. 34

(58) Field of Classification Search ................... 60/274, 60/275, 284, 286, 298, 300, 303, 320, 321; 422/186.01, 186.03, 186.04, 186.11, 186.15, 422/186.16, 186.19, 186.2, 186.22; 165/52, 165/66, DIG. 32, DIG. 34

See application file for complete search history.

(56) References Cited

U.S. PATENT DOCUMENTS

| | | | |
|---|---|---|---|
| 3,285,709 A * | 11/1966 | Eannarino et al. | ........... 422/114 |
| 4,726,814 A | 2/1988 | Weitman | |
| 5,366,701 A * | 11/1994 | Taylor et al. | ........... 422/186.04 |
| 5,419,123 A | 5/1995 | Masters | |
| 5,656,048 A | 8/1997 | Smith et al. | |
| 5,711,147 A | 1/1998 | Vogtlin et al. | |
| 5,746,984 A | 5/1998 | Hoard | |
| 5,887,554 A | 3/1999 | Cohn et al. | |
| 5,891,409 A | 4/1999 | Hsiao et al. | |
| 5,893,267 A | 4/1999 | Vogtlin et al. | |
| 6,012,283 A | 1/2000 | Miller et al. | |
| 6,029,442 A | 2/2000 | Caren et al. | |
| 6,038,854 A | 3/2000 | Penetrante et al. | |

(Continued)

FOREIGN PATENT DOCUMENTS

CA 1258441 8/1989

(Continued)

OTHER PUBLICATIONS

Hackam et al., "Air Pollution Control by Electrical Discharges", vol. 7, Issue No. 5, Oct. 2000, pp. 654-683.

(Continued)

*Primary Examiner*—Binh Q Tran
(74) *Attorney, Agent, or Firm*—Ridout & Maybee LLP

(57) ABSTRACT

A combined EGR cooler and non-thermal plasma device has first and second fluid passageways which are in heat exchange communication with one another. One or more electrodes are located in the second fluid passageway. The electrodes are connected to a voltage source. When a voltage of sufficient magnitude is applied to the electrodes, a non-thermal plasma is generated in the second fluid passageway. The device can be constructed in the form of a shell-and-tube heat exchanger or a stacked-tube type heat exchanger, wherein the electrodes extend through the heat exchange tubes. Hot exhaust gases preferably flow through the tubes in heat exchange contact with a liquid coolant, thereby cooling the exhaust gases. The electrodes generate non-thermal plasma inside the tubes, converting at least a portion of the NO in the exhaust to $NO_2$, which reacts with soot in the exhaust gases to generate $CO_2$ and $N_2$, thereby cleaning the exhaust gases.

27 Claims, 6 Drawing Sheets

U.S. PATENT DOCUMENTS

| | | |
|---|---|---|
| 6,047,543 A | 4/2000 | Caren et al. |
| 6,048,500 A | 4/2000 | Caren et al. |
| 6,092,512 A | 7/2000 | Ma |
| 6,173,567 B1 | 1/2001 | Poola et al. |
| 6,185,930 B1 | 2/2001 | Lepperhoff et al. |
| 6,357,223 B1 | 3/2002 | Caren et al. |
| 6,363,716 B1 | 4/2002 | Balko et al. |
| 6,479,023 B1 | 11/2002 | Evans et al. |
| 6,557,340 B1 | 5/2003 | Twigg et al. |
| 6,606,855 B1 | 8/2003 | Kong et al. |
| 6,655,130 B1 | 12/2003 | Kirwan et al. |
| 6,662,552 B1 | 12/2003 | Gunther et al. |
| 6,694,725 B2 | 2/2004 | Furman et al. |
| 6,758,035 B2 | 7/2004 | Smaling |
| 6,772,584 B2 | 8/2004 | Chun et al. |
| 6,804,950 B2 | 10/2004 | Kong et al. |
| 6,811,757 B2 | 11/2004 | Niv et al. |
| 7,060,231 B2 * | 6/2006 | Cho et al. .............. 422/186.04 |
| 7,074,370 B2 * | 7/2006 | Segal et al. ............ 422/186.04 |
| 7,207,169 B2 * | 4/2007 | Nakanishi et al. ............. 60/275 |
| 2005/0067153 A1 | 3/2005 | Wu et al. |

FOREIGN PATENT DOCUMENTS

| | | |
|---|---|---|
| WO | WO 01/94006 A2 | 12/2001 |

OTHER PUBLICATIONS

U.S. Appl. No. 11/097,475, filed Apr. 1, 2005, Martin et al.

Stuart Birch, "Toward cleaner diesels", SAE Automotive Engineering International, vol. 107, No. 11, Nov. 1999, p. 67.

"Toward cleaner diesels", SAE Automotive Engineering International, vol. 108, No. 12, Dec. 2000, p. 80.

Website Materials re: Electrocat Diesel Particulate Filter, Dec. 15, 2000, 20 pages.

Urashima et al., "Removal of Volatile Organic Compounds from Air Streams and Industrial Flue Gases by Non-Thermal Plasma Technology", IEEE Transactions on Dielectrics and Electrical Insulation, vol. 7, No. 5, Oct. 2000, pp. 602-614.

Khair et al., "Synergistic Approach to Reduce Nitrogen Oxides and Particulate Emissions from Diesel Engines, 08-9051", Southwest Research Institute Website, 1999, 17 pages.

Ismail et al., "The Heat Transfer Characteristics of Exhaust Gas Recirculation (EGR) Cooling Devices", International Mechanical Engineering Congress and Exposition, Nov. 2002, pp. 1-9.

* cited by examiner

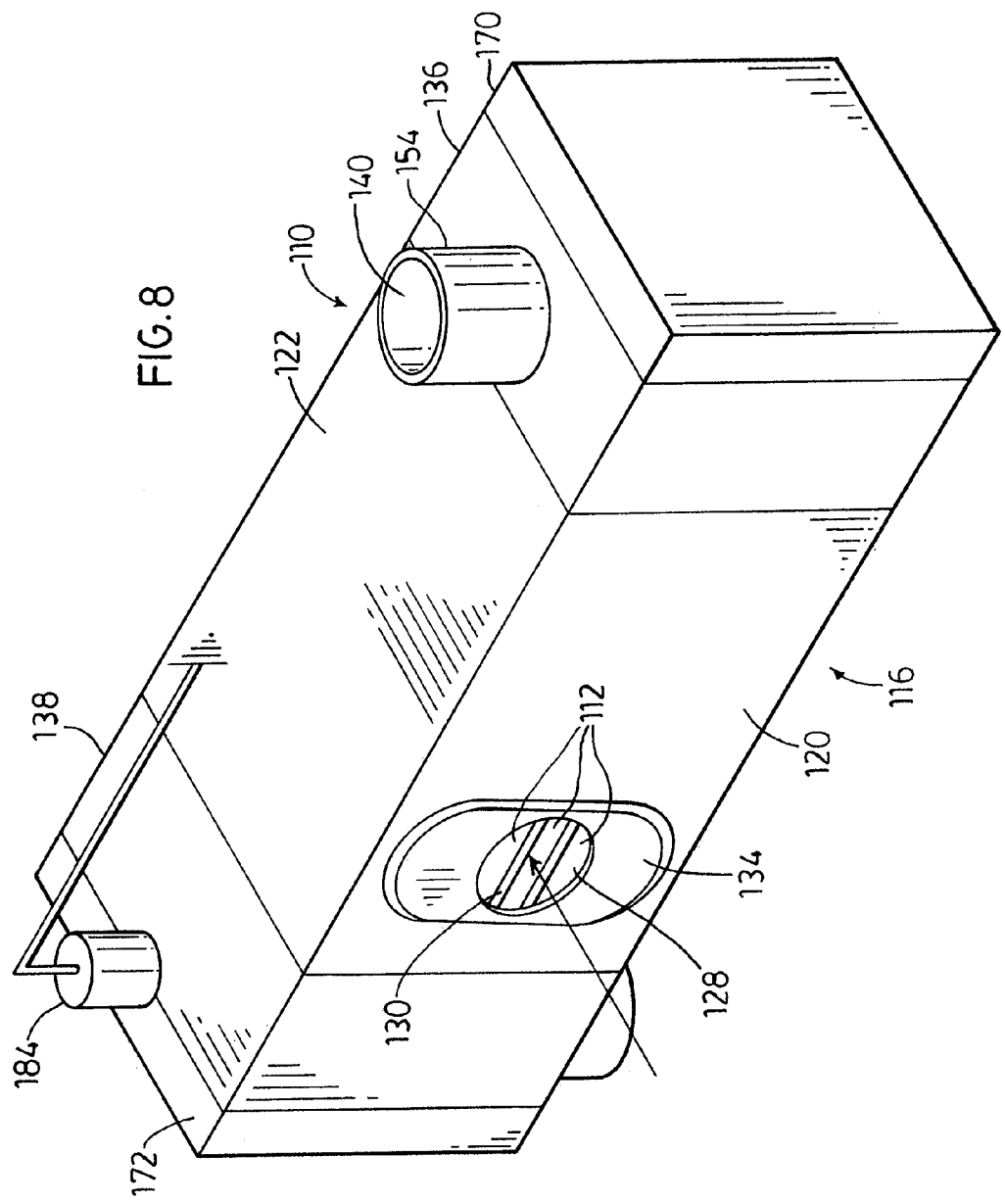

COMBINED EGR COOLER AND PLASMA REACTOR

FIELD OF THE INVENTION

The invention relates to exhaust gas systems of internal combustion engines which use exhaust gas recirculation (EGR) to reduce emissions of nitrogen oxides ($NO_x$), and more specifically to such exhaust systems which also include means for reducing the soot content of the exhaust gas stream.

BACKGROUND OF THE INVENTION

The exhaust gases of internal combustion engines may contain a number of combustion by-products, including $NO_x$, particulate matter such as carbonaceous soot, and unburned hydrocarbon fuel. In particular, the exhaust gases of diesel engines contain significant amounts of $NO_x$ and soot, and $NO_x$ content is also high in the exhaust gases of so-called "lean burn" engines in which the fuel is combusted with excess oxygen in order to increase engine efficiency. The exhaust gas streams of lean burn engines may also contain significant amounts of oxygen.

The harmful effects of releasing $NO_x$, soot and volatile organic compounds into the atmosphere are well documented. $NO_x$ participates in the generation of photochemical smog, acid rain and ozone. Soot particulates in the air contribute to poor visibility and respiratory disease.

In both compression (diesel) and spark ignition engines, EGR systems have been used to decrease $NO_x$ emissions. EGR systems can reduce $NO_x$ emissions of diesel engines by 40 to 50%, and greater reductions are possible by cooling the recirculated exhaust gas using an EGR cooling device such as a compact shell-and-tube heat exchanger. There are, however, limits on the amount of exhaust gas which can be reintroduced into the engine before power output and fuel economy are adversely impacted, and it has been found that the reintroduction of exhaust gases into the engine can significantly increase the soot content of the exhaust gas.

The presence of large amounts of soot in the exhaust gas can lead to fouling of the internal surfaces of the EGR cooler. It is believed that fouling decreases the performance of the EGR cooler by creating a low conductivity thermal barrier on the heat exchange surfaces, by causing surface roughness on the heat exchange surfaces which increases the pressure drop, and by constricting the passages through which the exhaust gases flow, especially in small diameter tubes.

It is known to use particulate traps and/or filters to reduce the soot content of an exhaust gas stream. Some of these traps and filters may include a plasma reactor which generates $NO_2$ to react with the soot and convert it to gaseous CO and/or $CO_2$. It is also known that the fouling of EGR coolers can be reduced or prevented by providing a particulate trap or filter upstream of an EGR cooler. However, these systems suffer from the disadvantage that an additional component is required in the exhaust gas stream for the purpose of reducing soot content. This adds to the cost and complexity of the exhaust system.

There remains a need for exhaust gas systems in which the fouling of the EGR cooler is partially or completely prevented in a manner which is simpler and more cost effective than in known systems.

SUMMARY OF THE INVENTION

According to one aspect of the invention there is provided a heat exchanger comprising: a first fluid passageway extending between a first inlet port and a first outlet port; a second fluid passageway extending between a second inlet port and a second outlet port, wherein the first and second fluid passageways are sealed from one another; at least one heat exchange surface through which the first and second fluid passageways are in heat exchange communication with one another; and at least one electrode located in the second fluid passageway; wherein the at least one electrode is connected to a voltage source which, during use of the heat exchanger, applies a voltage to the at least one electrode; and wherein the voltage is of sufficient magnitude to cause the at least one electrode to generate a non-thermal plasma in the second fluid passageway.

According to another aspect, there is provided a method for reducing emissions of nitrogen oxides in the exhaust stream of an internal combustion engine. The method comprises: (a) providing a heat exchanger according to the invention in the exhaust stream of the internal combustion engine; (b) passing hot exhaust gases through the exhaust gas stream and through the second fluid passageway of the heat exchanger, such that hot exhaust gases flowing through the exhaust gas stream enter the heat exchanger through the second inlet port, flow through the second fluid passageway and exit the heat exchanger through the second outlet port; wherein the hot exhaust gases contain amounts of nitric oxide and carbonaceous soot; (c) passing a coolant through the first fluid passageway; and (d) energizing the voltage source so as to apply a voltage to the at least one electrode; wherein the voltage is of sufficient magnitude to cause the at least one electrode to generate a non-thermal plasma in the second fluid passageway, wherein the non-thermal plasma causes at least a portion of the nitric oxide in the hot exhaust gases to be converted to nitrogen dioxide, which reacts with the soot to generate carbon dioxide and nitrogen.

BRIEF DESCRIPTION OF THE DRAWINGS

Preferred embodiments of the invention are now described, by way of example only, with reference to the accompanying drawings in which:

FIG. 8 is a schematic, perspective view of the heat exchanger of FIG. 6.

DETAILED DESCRIPTION OF PREFERRED EMBODIMENTS

Figure 1:
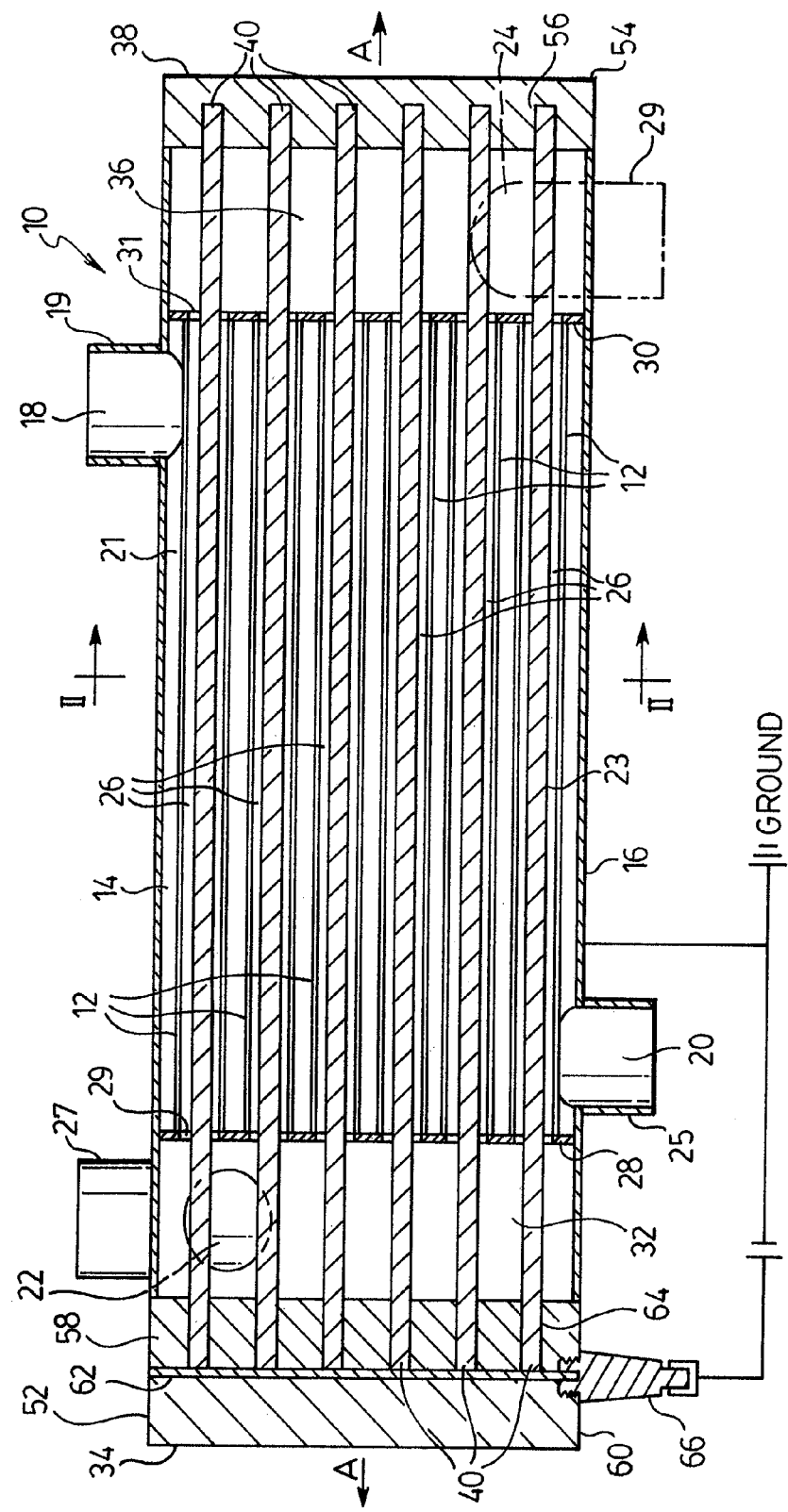
FIG. 1 is a schematic, longitudinal cross section of a heat exchanger according to a first preferred embodiment of the invention.
Figure 2:
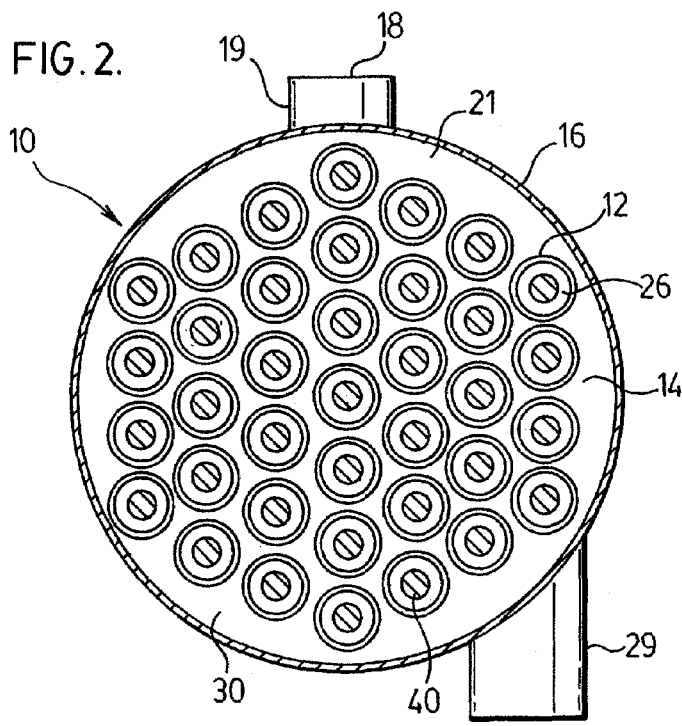
FIG. 2 is a transverse cross section along line II-II' of FIG. 1.

FIGS. 1 to 4 schematically illustrate a first preferred heat exchanger 10 according to the invention. Heat exchanger 10 is of the "shell and tube" type, comprising a plurality of tubes 12 extending parallel to one another and defining a longitudinal axis A. The tubes 12 are arranged in the form of a tube bundle 14. For simplicity, only six tubes 12 of tube bundle 14 are shown in FIG. 1. The tube bundle 14 is enclosed along its sides by an axially extending outer shell or housing 16. The housing 16 of heat exchanger 10 has a cylindrical side wall extending parallel to longitudinal axis A. It will be appreciated that the housing 16 is not necessarily cylindrical, but can be of any desired shape. For example, housing 16 may have a transverse cross section which is in the form of a regular or irregular polygon.

The side wall of housing 16 is provided with a first inlet port 18 and a first outlet port 20 which are in communication with one another through a first fluid passageway 21, which comprises the interior of the housing 16, between the ends of tubes 12. In use, a first heat exchange fluid flows through the interior of housing 16 between the first inlet port 18 and the first outlet port 20, in contact with the exterior surfaces of tubes 12. The first inlet port 18 and first outlet port 20 are provided with first inlet and outlet fittings 19 and 25, respectively through which the first fluid enters and leaves the first fluid passageway 21. In the heat exchanger 10 shown in the drawings, the inlet and outlet fittings 19, 25 are in the form of cylindrical tubes which extend outward at 90 degrees from the side wall of housing 16. It will, however, be appreciated that the fittings 19, 25 can be of various configurations and that they may be angled at less than or greater than 90 degrees relative to the housing 16.

The first inlet and outlet ports 18, 20 are spaced apart along axis A to provide an axial flow of the first heat exchange fluid. In addition, the first inlet and outlet ports 18, 20 may be spaced apart circumferentially to ensure a cross-flow across the tube bundle 14. In the example shown in the drawings, the first inlet and outlet ports 18, 20 and their respective fittings 19, 25 are circumferentially spaced by about 180 degrees.

The side wall of housing 16 also has a second inlet port 22 and a second outlet port 24 which are in communication with one another through a second fluid passageway 23 which includes the hollow interiors 26 of tubes 12. In use, a second heat exchange fluid flows through the interiors 26 of tubes 12 between the second inlet port 22 and the second outlet port 24, the second fluid being in heat exchange communication with the first fluid through the side walls of tubes 12.

The second inlet and outlet ports 22, 24 are provided with second inlet and outlet fittings 27, 29, respectively through which the second fluid enters and leaves the second fluid passageway 21. The above statements regarding the shape and location of the first inlet and outlet ports 18, 20 and fittings 19, 25 apply also to the second inlet and outlet ports 22, 24 and their respective fittings 27, 29.

The heat exchanger further comprises sealing means adjacent to the ends of the tubes for preventing flow of fluid between the fluid passageways 21, 23. In the embodiment shown in FIG. 1, the sealing means comprises a pair of perforated tube sheets 28, 30, also known as "headers", which are in sealed engagement with the ends of tubes 12. The tube sheets 28, 30 also have peripheral outer edges which are sealed to the side wall of the housing 16. In heat exchanger 10 shown in the drawings, the tube sheets 28, 30 are circular. However, it will be appreciated that the shape of tube sheets 28, 30 is variable and is dictated by the shape of the housing 16.

It will be appreciated that the use of headers is not essential to the invention. Other types of sealing means can be used. For example, it is possible to construct heat exchanger 10 using a "headerless" construction in which the ends of tubes 12 are expanded and sealed to one another to eliminate the need for perforated tube sheets. An example of such a headerless construction is described in commonly assigned U.S. application Ser. No. 10/778,571, published as US 2005/0067153 A1 on Mar. 31, 2005, which is incorporated herein by reference in its entirety.

The perforations 29 and 31 in tube sheets 28 and 30 are preferably of sufficient diameter so as not to restrict the flow of the second heat exchange fluid through tubes 12. In the embodiment shown in the drawings, the perforations 29 and 31 preferably have a diameter which is the same as the inside diameter of tubes 12. This is, however, not necessarily the case. For example, the perforations 29 and 31 may preferably be of sufficient diameter such that the tube ends can be received inside the perforations 29 and 31.

Figure 3:
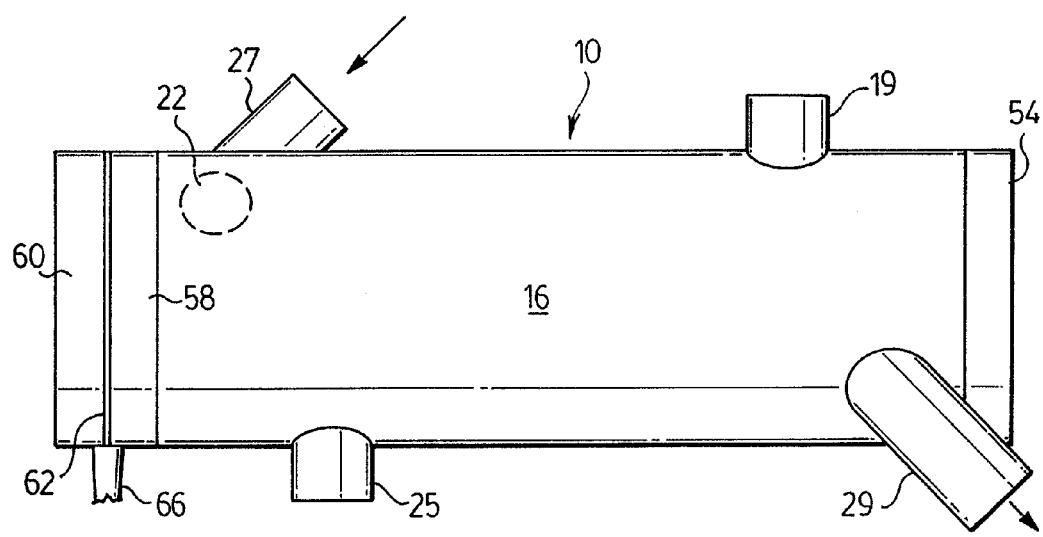
FIGS. 3 and 4 are side views of the heat exchanger of FIG. 1 in which the second inlet and outlet fittings are angled.
Figure 4:
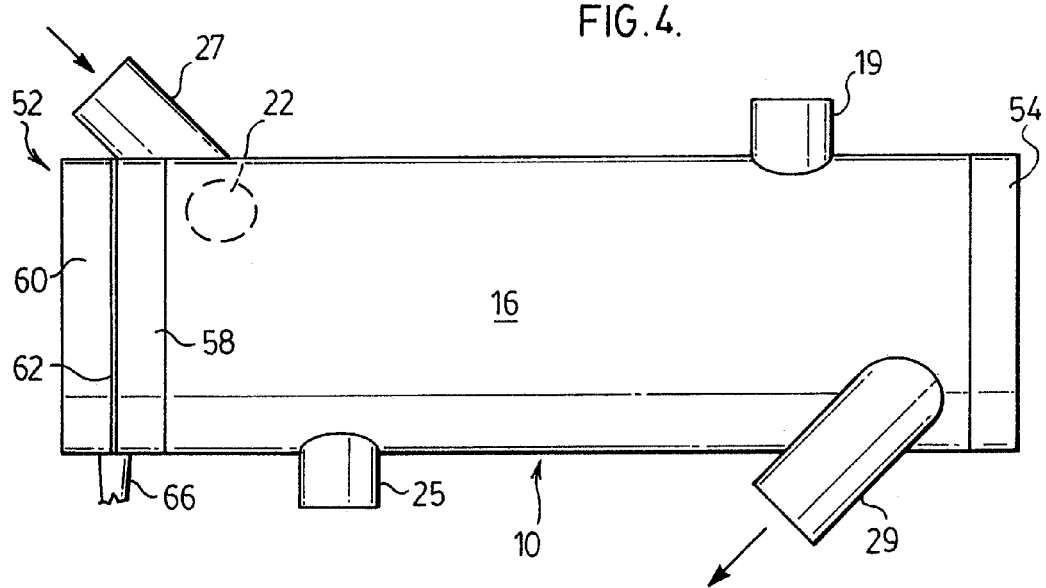

It will be seen from FIG. 1 that the second fluid passageway 23 further comprises an inlet manifold 32 formed between the tube sheet 28 and a first end 34 of heat exchanger 10, and an outlet manifold 36 formed between the tube sheet 30 and the second end 38 of heat exchanger 10. The provision of these manifolds 32 and 36 ensures a substantially even distribution of the second heat exchange fluid among the tubes 12 of the tube bundle 14. To further enhance flow distribution, it may be preferred to angle the second inlet and outlet fittings 27, 29 relative to the housing 16. FIGS. 3 and 4 illustrate two possible angled configurations. As shown in these drawings, the second inlet fitting 27 can be angled toward (FIG. 4) or away from (FIG. 3) the direction of direction of flow through the second fluid passageway 23. Similarly, the second outlet fitting 29 can be angled toward (FIG. 3) or away from (FIG. 4) the direction of flow. It will be appreciated that configurations other than those shown in FIGS. 3 and 4 can also be used, i.e. the second fluid inlet and outlet fittings 27, 29 can be independently angled toward or away from the direction of flow, with the angles being variable.

Thus, heat exchanger 10 comprises a first fluid passageway 21 which comprises the interior of housing 16 and extends longitudinally between the tube sheets 28, 30; and a second fluid passageway 23 which comprises the interiors 26 of tubes 12 and the inlet and outlet manifolds 32, 36. The fluid passageways 21, 23 are in heat exchange communication with each other through at least one heat exchange surface. In the preferred heat exchanger 10 there are a plurality of heat exchange surfaces, each of which comprises the side wall of a tube 12. Where the heat exchanger 10 is an EGR cooler, the first heat exchange fluid comprises a liquid coolant and the second heat exchange fluid comprises hot exhaust gases which are cooled by heat exchange with the liquid coolant as they pass through the tubes 12.

Heat exchanger 10 further comprises at least one electrode 40 which is located in the second fluid passageway 23, i.e. the exhaust gas passageway where the heat exchanger comprises an EGR cooler. In the shell and tube construction of heat exchanger 10, a plurality of electrodes 40 is preferably provided, each extending through the hollow interior 26 of one of the tubes 12. More preferably, all the tubes 12 are provided with an electrode 40. Since the electrode 40 takes up a portion of the interior volume of the tube 12 which it occupies, it may be preferred that the tubes 12 be somewhat larger in diameter than the tubes of a conventional shell and tube heat exchanger, or that a greater number of tubes be used, so as to maintain sufficient flow of the second heat exchange fluid through the tubes.

The electrodes 40 are sufficiently long to extend completely through the tubes 12, through the tube sheets 28, 30 and completely through the inlet and outlet manifolds 32, 36. The electrodes 4Q are preferably in the form of cylindrical metal rods and are preferably of sufficient rigidity to require minimal support between their ends. In one embodiment of the invention, the electrodes comprise stainless steel rods having a diameter of about ⅛ inches.

Figure 5:
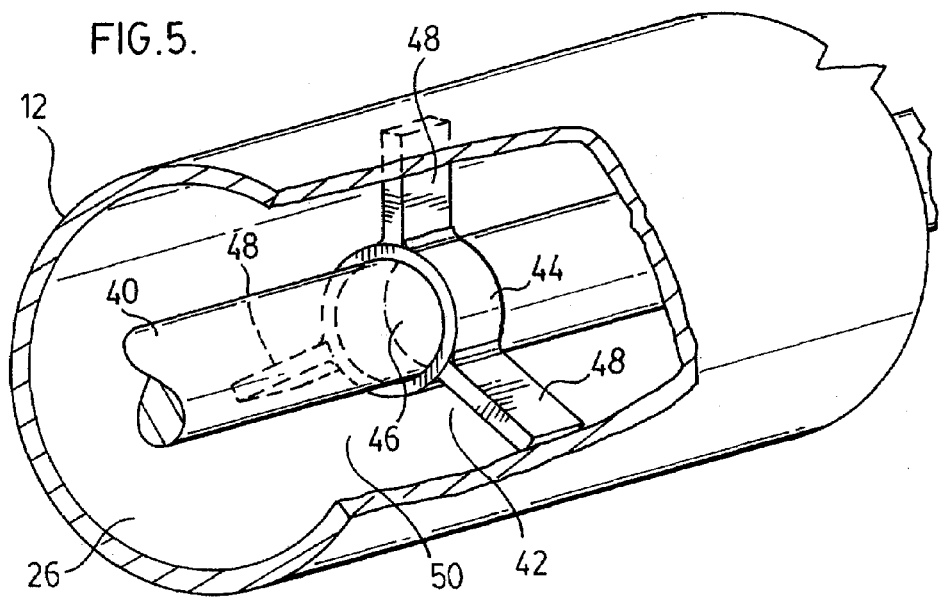
FIG. 5 illustrates a preferred form of electrode spacer for use in the heat exchanger shown in FIG. 1.

The electrodes 40 extend through the tubes 12 and tube sheets 28, 30 in spaced relation thereto, and the electrodes 40 may be supported between their ends so as to maintain a desired spacing from the side walls of tubes 12. For this purpose, spacers may be provided inside tubes 12 in order to maintain the spacing. FIG. 5 illustrates an example of a spacer 42 which can be used to maintain the spacing between electrodes 40 and the side walls of tubes 12. Spacer 42 is made from an electrically insulating material such as ceramic and includes a central hub 44 having an opening 46 through which an electrode can extend. The spacer 42 also comprises a plurality of radial arms 48 extending outwardly from the hub 44 by a distance which is sufficient so that the arms 48 make contact with the inner surfaces of the tubes 12. The second heat exchange fluid flows through the gaps 50 between arms 48.

The electrodes 40 are supported at their ends by a pair of electrically insulating structures. These structures may preferably be in the form of end caps 52, 54 which close the opposite ends 34, 38 of heat exchanger 10. The end caps 52 and 54 are shown in FIG. 1 as being in sealed engagement with the housing 16. It will be appreciated that the means for engagement between the end caps 52, 54 and the housing 16 is variable. For example, there may be some overlap between the end caps 52, 54 and housing 16, and/or the end caps 52, 54 may be partially or completely received inside the housing 16. End cap 52 is provided with means for supplying a voltage to the electrodes 40, this being discussed in greater detail below.

The end cap 54 of FIG. 1 is in the form of a plate or a disk of electrically insulating material such as ceramic. The end cap 54 is cast or otherwise formed to have a plurality of holes 56 in which the ends of electrodes 40 are received. The holes 56 extend only partway through the end cap 54 so as to completely surround the ends of the electrodes 40. In heat exchanger 10, the end cap 54 comprises a cylindrical disk having a diameter substantially the same as that of the housing 16.

The other end cap 52 shown in FIG. 1 is comprised of two layers 58, 60 of electrically insulating material separated by a conducting layer 62. The insulating layers 58, 60 may also be in the form of perforated plates or disks as described above with reference to end cap 54. One of the layers 58, located inwardly from the end 34 of heat exchanger 10, has a plurality of perforations 64 extending completely therethrough. The ends of electrodes 40 extend completely through the perforations 64 and are in contact with the conductive layer 62, which may preferably comprise a metal plate or disk of the same diameter as layers 58, 60. Preferably, the conductive layer 62 is formed of a metal which is the same as or compatible with the metal from which the electrodes 40 are made. For example, where the electrodes 40 comprise stainless steel rods, the conductive layer 62 may be comprised of a stainless steel plate or disk. In some embodiments of the invention, it may be preferred to bond the electrodes 40 to the conductive layer 62 and/or bond the insulating layers 58, 60 to conducting layer 62.

The second insulating layer 60 is located at the end 34 of heat exchanger 10 and covers the conductive layer 62.

The conductive layer 62 of end cap 52 is in electrical communication with a source of high voltage 66, which may preferably comprise a modified spark plug. The voltage source 66 is preferably capable of delivering a pulsed voltage of from about 1 to about 30 kV and with a low current. The voltage requirements will depend on the geometry and the magnitude necessary to generate a desirable plasma discharge. The frequency may also be varied to enhance performance or may be varied to match engine speed and gas flow rate. The modified spark plug may preferably be supplied by the vehicle's electrical energy storage unit and the voltage pulse may preferably be controlled by a fast acting switch programmed into the vehicle's electronic control module.

When used as an EGR cooler, the first inlet and outlet fittings 19, 25 of heat exchanger 10 are connected to a coolant loop, and a liquid coolant flows through the first fluid passageway 21 in contact with the tubes 12. The liquid coolant may preferably comprise a glycol/water engine coolant. The second inlet and outlet fittings 27, 29 are connected into the exhaust system so that a hot exhaust gas flows through the second fluid passageway 23, passing through the interiors 26 of tubes 12. The exhaust gas will contain some amount of nitric oxide (NO) and carbonaceous soot. As the hot exhaust gases pass through the tubes 12 they are in heat exchange contact with the liquid coolant through the side walls of the tubes 12. Heat from the exhaust gases is transferred through the side walls of tubes 12 and is absorbed by the coolant as in a conventional EGR cooler.

In addition, voltage pulses are conducted to the electrodes 40 through the conducting layer 62 of end cap 52. These voltage pulses result in electrical discharge from the electrodes 40, resulting in the generation of a non-thermal discharge plasma inside the tubes 12. The plasma discharge converts at least a portion of the NO to nitrogen dioxide ($NO_2$), which reacts with the soot to generate carbon dioxide ($CO_2$) and nitrogen ($N_2$). The exhaust gas which exits the heat exchanger 10 is therefore cleaner and contains lower amounts of $NO_x$ and soot than before treatment in heat exchanger 10. At least a portion of the cleaned, cooled exhaust gas exiting the heat exchanger 10 is directed to the intake manifold of the engine (not shown).

The plasma discharge is also expected to provide other benefits. For example, the plasma causes the formation of free radicals, some of which may still be present in the exhaust gas when it enters the combustion chamber of the engine, depending on the proximity of the heat exchanger 10 to the intake manifold. This is expected to enhance the combustion process. In addition, it is believed that the established electric field may generate additional forces in the gas stream, these forces being referred to as electrohydrodynamic forces (electrophoretic) or more commonly referred to as "corona wind". These forces may enhance heat transfer by increasing turbulence within the second fluid passageway 23 and consequently decreasing the thermal boundary layer.

Figure 6:
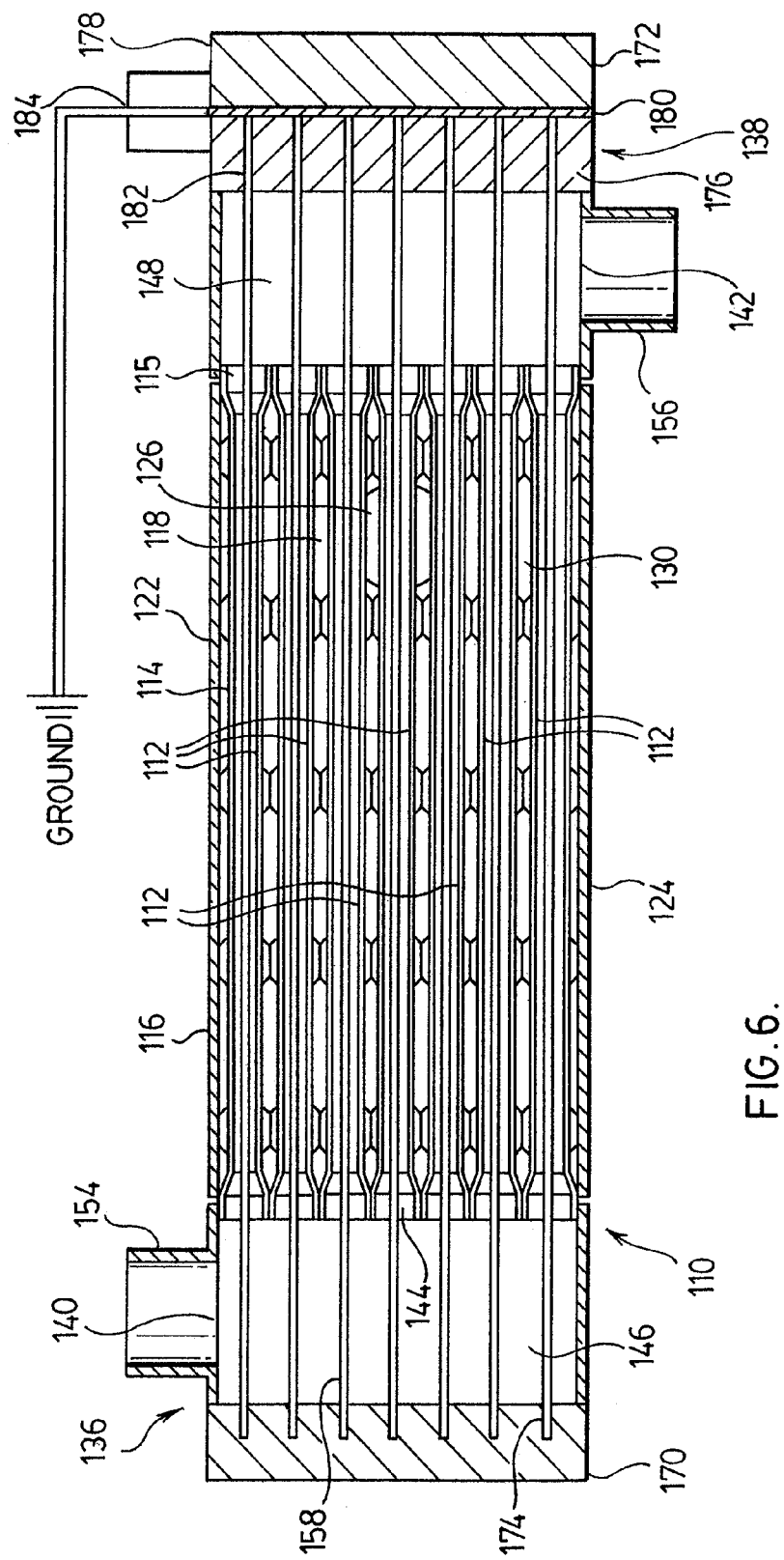
FIG. 6 is a schematic, longitudinal cross section of a heat exchanger according to a second preferred embodiment of the invention.
Figure 7:
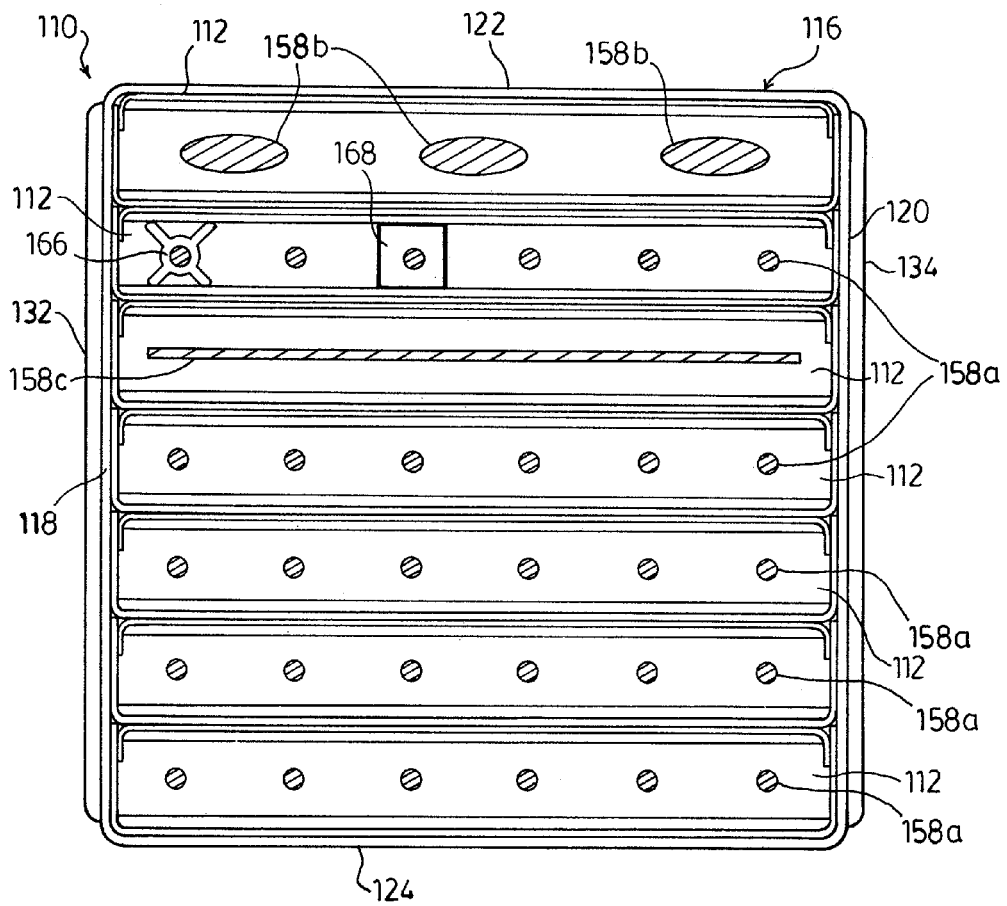
FIG. 7 is an end view of the heat exchanger of FIG. 6 with end cap 138 removed, and showing a number of possible electrode and spacer configurations.

A second preferred heat exchanger 110 is schematically illustrated in FIGS. 6 to 8. Heat exchanger 110 is of the "stacked tube" type, similar to that described in U.S. patent application Ser. No. 11/097,475 (Martin et al.), filed on Apr. 1, 2005 and entitled "Stacked-Tube Heat Exchanger", which is incorporated herein by reference in its entirety.

The heat exchanger 110 comprises a plurality of elongate, generally flat tubes 112, each having a width dimension greater than its height dimension. The tubes 112 may preferably be identical to tubes 12 of heat exchanger 10 described in above-mentioned U.S. application Ser. No. 11/097,475, either being constructed in one piece or comprising plate pairs as shown in FIG. 7. The tubes 112 extend parallel to one another to define a longitudinal axis A and are arranged in the form of a tube stack 114. The tubes have end portions 115 which are expanded in the vertical direction so that the end portions 115 have a height which is greater than a height of the central portions of tubes 112. This permits the central portions of the tubes 112 to be spaced apart while the end portions 115 may be sealed directly to one another without the need for a perforated header or tube sheet. Although heat exchanger 110 is shown as having a headerless construction, it will be appreciated that the tubes 112 of heat exchanger 110 may instead be of constant height and the tube ends 115 may be received in slotted headers which seal the ends of the first fluid flow passageway 130.

The tube stack 114 is enclosed along its sides by an axially extending outer shell or housing 116, which may preferably be identical to the housing 44 of heat exchanger 10 described in above-mentioned U.S. application Ser. No. 11/097,475. The housing 116 of heat exchanger 110 has a pair of side plates 118, 120 and a pair of end plates 122, 124 extending along the axis A. The housing 116 shown in the drawings has a rectangular transverse cross sectional shape. It will, however, be appreciated that the housing can have any suitable shape, depending on the shape of the tube stack 114 which it surrounds. The ends of housing 116 overlap with and are sealed to the end portions 115 of the tubes 112, although any of the alternate arrangements disclosed in above-mentioned U.S. application Ser. No. 11/097,475 could be used instead, for example the arrangements shown in FIGS. 4A, 4B and 4C of application Ser. No. 11/097,475.

The side wall of housing 116 is provided with a first inlet port 126 and a first outlet port 128 (only inlet port 126 is visible in FIG. 6) which are in flow communication with one another through a first fluid passageway 130. The first fluid passageway 130 comprises the spaces between adjacent tubes 112, and both ports 126, 128 are in flow communication with each of the spaces between adjacent tubes 112 in the stack 114. In order to provide flow communication between the ports 126, 128 and the spaces between the tubes 112, the ports 126, 128 are located in raised manifolds 132, 134 (see FIG. 7), each of which comprises a raised portion of one of the side plates 118, 120 which extends throughout substantially the entire height of the side plate 118, 120. The raised manifolds 132, 134 may preferably have the same appearance as manifolds 56, 60 described in application Ser. No. 11/097,475.

As with heat exchanger 10 described above, heat exchanger 110 is provided with a pair of end caps 136, 138 which close the opposite ends of heat exchanger 110. The end caps 136, 138 preferably have a rectangular transverse cross section and are in sealed, overlapping engagement with the end portions 115 of tubes 112. It will be appreciated that various alternative arrangements are possible for sealing the ends of the heat exchanger 110, including those disclosed in application Ser. No. 11/097,475, and mentioned above. For example, the end caps 136, 138 could overlap the ends of the housing 116 or the ends of the housing 116 could overlap the end caps 136, 138.

The end caps 136, 138 are provided with a second inlet port 140 and a second outlet port 142, respectively. The second inlet and outlet ports 140, 142 are in flow communication with one another through a second fluid passageway 144 which includes the hollow interiors of tubes 112. In use, a second heat exchange fluid flows through the interiors 126 of tubes 112 between the second inlet port 122 and the second outlet port 124, the second fluid being in heat exchange communication with the first fluid through the side walls of tubes 112. As shown in the drawings, a first manifold space 146 is provided within the first end cap 136 to provide flow communication between all the tube ends 115 and the second inlet port 140, and a second manifold space 148 is provided within the second end cap 138 to provide flow communication between all the tube ends 115 and the second outlet port 142.

Although not shown in the drawings, it will be appreciated that the first inlet and outlet ports 126, 128 may be provided with inlet and outlet fittings, and the second inlet and outlet ports 140, 142 are provided with inlet and outlet fittings 154, 156. The shapes and configurations of the fittings are of course partly dependent on packaging requirements and are therefore highly variable. For example, the inlet and outlet fittings 154, 156 of the second inlet and outlet ports 140, 142 may preferably be of the same shape and configuration as inlet and outlet ports 27, 29 of heat exchanger 10 described above.

Thus, heat exchanger 110 comprises a first fluid passageway 130 which is located in the interior of housing 116 and comprises the spaces between adjacent tubes 112, and a second fluid passageway 144 which comprises the interiors of tubes 112 and the inlet and outlet manifold spaces 146, 148. The fluid passageways 130, 144 are in heat exchange communication with each other through at least one heat exchange surface. In the preferred heat exchanger 110 there are a plurality of heat exchange surfaces, comprising the top and bottom walls of tubes 112. Where the heat exchanger 110 is an EGR cooler, the first heat exchange fluid comprises a liquid coolant and the second heat exchange fluid comprises hot exhaust gases, as in the first preferred embodiment.

Heat exchanger 110 further comprises at least one electrode 158 which is located in the second fluid passageway 144, which is the exhaust gas passageway in the case where heat exchanger 110 comprises an EGR cooler. In the stacked tube construction of heat exchanger 110, a plurality of electrodes 158 is preferably provided, each extending through the hollow interior of one of the tubes 112. More preferably, the interior of each tube 112 is provided with at least one electrode 158 and, as shown in FIG. 7, each tube 112 may be provided with a plurality of electrodes 158 arranged in spaced, parallel relation to one another. Since a portion of the interior volume of each tube 112 is taken up by the electrodes 158, it may be preferred that the tubes 112 be somewhat larger in cross-sectional area than the tubes of a conventional stacked tube heat exchanger, or that a greater number of tubes 112 be used, so as to maintain sufficient flow of the second heat exchange fluid through the tubes 112.

The electrodes 158 are sufficiently long to extend completely through the tubes 112 and through the tube ends 115. The electrodes 158 may preferably extend completely through the inlet and outlet manifold spaces 146, 148. The electrodes 158 may preferably in the form of metal rods which are of sufficient rigidity to require minimal support between their ends. In one embodiment of the invention, the electrodes comprise stainless steel rods 158a having a diameter of about ⅛ inches. FIG. 7 illustrates three preferred forms of electrodes 158. Most of the tubes 112 shown in FIG. 7 contain a plurality of electrodes 158a in the form of cylindrical rods, the electrodes 158a being spaced from one another across the width of the tubes 112. One of the tubes 112 shown in FIG. 7 contains a plurality of electrodes 158b having a flattened, oval cross section, and another of the tubes 112 contains a single flat, sheet-type electrode 158c which may or may not be perforated. Other shapes are also possible. For example, the electrodes 158c may be in the form of wire mesh or expanded metal. It will be appreciated that the various electrode configurations shown in FIG. 7 are for illustrative purposes only. It may be preferred that each embodiment of the heat exchanger according to the invention will have only one type of electrode.

The electrodes 158 extend through the tubes 112 in spaced relation thereto and in spaced relation to each other. The electrodes 158 may be supported between their ends so as to maintain a desired spacing from the side walls of tubes 112. For this purpose, spacers may be provided inside tubes 112 in order to maintain the spacing. FIG. 7 shows two different types of spacers which may be used with rod-shaped electrodes such as electrodes 158a and 158b of FIG. 7. According to one embodiment, a spacer 166 is provided which is identical in construction to spacer 42 described above except that it has four legs for added stability inside the rectangular tube 112. In another embodiment, a spacer 168 is provided in the form of a block with a central aperture through which the electrode 158 extends. It will be appreciated that many alternate forms of spacers are possible within the scope of the invention, depending on the electrode and tube shapes.

The electrodes 158 are supported at their ends by a pair of electrically insulating structures. These structures may preferably be in the form of end caps 170, 172 which close the opposite ends of heat exchanger 110. The end caps 170 and 172 are shown in FIG. 6 as being in sealed engagement with the housing 116. It will be appreciated that the means for engagement between the end caps 170, 172 and the housing 116 is variable. For example, there may be some overlap between the end caps 170, 172 and housing 116, and/or the end caps 170, 172 may be partially or completely received inside the housing 116. End cap 172 is provided with means for supplying a voltage to the electrodes 158, as discussed below. In heat exchanger 110, the end caps 170, 172 have a rectangular size and shape corresponding to that of housing 116, although their shape can be varied.

The end cap 170 of FIG. 6 is in the form of a plate of electrically insulating material such as ceramic. The end cap 170 is cast or otherwise formed to have a plurality of holes 174 in which the ends of electrodes 158 are received. The holes 174 extend only partway through the end cap 170 so as to completely surround the ends of the electrodes 158.

The other end cap 172 shown in FIG. 6 is comprised of two layers 176, 178 of electrically insulating material separated by a conducting layer 180. One of the insulating layers 176 is in the form of a perforated plate, having a plurality of perforations 182 extending completely therethrough. The ends of electrodes 158 extend completely through the perforations 182 and are in contact with the conductive layer 180, which may preferably comprise a metal plate. The comments above regarding the choice of materials for the electrodes 40 and the conducting layer 62 apply here as well. In some embodiments of the invention, it may be preferred to bond the electrodes 158 to the conductive layer 180 and/or bond the insulating layers 176, 178 to the conducting layer 180. The second insulating layer 178 is located at the end of heat exchanger 110 and covers the conductive layer 180.

The conductive layer 180 of end cap 172 is in electrical communication with a source of high voltage 184, which may preferably be the same as that described above with reference to the first preferred embodiment.

The use of heat exchanger 110 as an EGR cooler is as described above in connection with heat exchanger 10.

Although the invention has been described in connection with certain preferred embodiments, it is not limited thereto. Rather, the invention includes within its scope all embodiments which may fall within the scope of the following claims.

What is claimed is:

1. A heat exchanger, comprising:
    a first fluid passageway extending between a first inlet port and a first outlet port;
    a second fluid passageway extending between a second inlet port and a second outlet port, wherein the first and second fluid passageways are sealed from one another;
    at least one heat exchange surface through which the first and second fluid passageways are in heat exchange communication with one another; and
    at least one electrode located in said second fluid passageway;
    wherein the at least one electrode is connected to a voltage source which, during use of the heat exchanger, applies a voltage to said at least one electrode;
    and wherein the voltage is of sufficient magnitude to cause the at least one electrode to generate a non-thermal plasma in the second fluid passageway;
    wherein the heat exchanger comprises a shell and tube heat exchanger comprising a plurality of parallel, elongate, longitudinally-extending tubes having hollow interiors, the tubes arranged in a tube bundle received within a longitudinally-extending housing;
    wherein the first fluid passageway comprises an interior of the housing and the second fluid passageway comprises the hollow interiors of the tubes;
    wherein said at least one least one heat exchange surface comprises side walls of the tubes;
    wherein each of said tubes has one of said electrodes extending longitudinally through its hollow interior in spaced relation to the tube side wall; and
    wherein opposite ends of said electrodes are supported by support structures located at opposite ends of the housing; said support structures preventing electrical contact between the electrode and the tube bundle and housing; one of said support structures incorporating an electrically conductive structure through which the voltage is applied to one end of each electrode.

2. The heat exchanger of claim 1, wherein the first and second inlet ports and the first and second outlet ports are formed in the housing.

3. The heat exchanger according to claim 1, wherein sealing means are provided adjacent to the ends of the tubes to prevent flow communication between the first and second fluid passageways.

4. The heat exchanger of claim 3, wherein the sealing means comprises a pair of headers located at opposite ends of the tubes; wherein the ends of the tubes are sealed to the headers and the headers are provided with a plurality of perforations, each of which communicates with an interior of one of the tubes.

5. The heat exchanger of claim 4, wherein the second fluid passageway further comprises an inlet manifold through which the second fluid inlet port communicates with the interiors of the tubes and an outlet manifold through which the second fluid outlet port communicates with the interiors of the tubes.

6. The heat exchanger of claim 1, wherein the at least one electrode is supported by one or more electrically insulating support structures.

7. The heat exchanger of claim 6, wherein the second fluid passageway is elongate and has opposite ends which are open; wherein each of the electrodes extends completely through the second fluid passageway; and wherein opposite ends of the electrodes are located outside the second fluid passageway and are supported by said support structures.

8. The heat exchanger of claim 7, wherein the housing has opposite ends to which the support structures are attached.

9. The heat exchanger of claim 8, wherein the support structures comprise end caps which seal the ends of the housing.

10. The heat exchanger of claim 7, further comprising an electrically conductive plate which is in electrical contact with one end of each of the electrodes and through which the voltage is applied to the electrodes, wherein the electrically conductive plate is attached to one of the support structures.

11. The heat exchanger of claim 6, wherein said support structures are located between opposite ends of the electrodes and maintain spacing between the electrodes and the at least one heat exchange surface.

12. The heat exchanger of claim 1, wherein the voltage is from about 1 to 30 kV.

13. The heat exchanger of claim 1, wherein the voltage is pulsed.

14. A heat exchanger, comprising:
- a first fluid passageway extending between a first inlet port and a first outlet port;
- a second fluid passageway extending between a second inlet port and a second outlet port, wherein the first and second fluid passageways are sealed from one another;
- at least one heat exchange surface through which the first and second fluid passageways are in heat exchange communication with one another; and
- at least one electrode located in said second fluid passageway;
- wherein the at least one electrode is connected to a voltage source which, during use of the heat exchanger, applies a voltage to said at least one electrode;

and wherein the voltage is of sufficient magnitude to cause the at least one electrode to generate a non-thermal plasma in the second fluid passageway;
- wherein the heat exchanger comprises a tube stack heat exchanger comprising a plurality of parallel, elongate, longitudinally-extending tubes having hollow interiors, each of the tubes having a width which is substantially greater than its height, the tubes arranged in a tube stack received within a longitudinally-extending housing;
- wherein the first fluid passageway comprises a plurality of spaces between the tubes and the second fluid passageway comprises the hollow interiors of the tubes;
- wherein said at least one heat exchange surface comprises side walls of the tubes;
- wherein each of said tubes has at least one of said longitudinally-extending electrodes extending through its hollow interior, wherein said at least one electrode is arranged in spaced relation to the tube side wall; and
- wherein opposite ends of said at least one electrode are supported by support structures located at opposite ends of the housing; said support structures preventing electrical contact between said at least one electrode and the tube stack and housing; one of said support structures incorporating an electrically conductive structure through which the voltage is applied to one end of each electrode.

15. The heat exchanger of claim 14, wherein each of said tubes has a plurality of said longitudinally-extending electrodes extending through its hollow interior and being in spaced parallel relation to one another across the width of the tube.

16. The heat exchanger of claim 14, wherein the first and second inlet ports and the first second outlets ports are formed in the housing.

17. The heat exchanger according to claim 14, wherein sealing means are provided adjacent to the ends of the tubes to prevent flow communication between the first and second fluid passageways.

18. The heat exchanger of claim 17, wherein the sealing means comprises a pair of headers located at opposite ends of the tubes; wherein the ends of the tubes are sealed to the headers and the headers are provided with a plurality of perforations, each of which communicates with an interior of one the tubes.

19. The heat exchanger of claim 18, wherein the second fluid passageway further comprises an inlet manifold through which the second fluid inlet port communicates with the interiors of the tubes and an outlet manifold through which the second fluid outlet port communicates with the interiors of the tubes.

20. The heat exchanger of claim 14, wherein the at least one electrode is supported by one or more electrically insulating support structures.

21. The heat exchanger of claim 20, wherein the second fluid passageway is elongate and has opposite ends which are open; wherein each of the electrodes extends completely through the second fluid passageway; and wherein opposite ends of the electrodes are located outside the second fluid passageway and are supported by said support structures.

22. The heat exchanger of claim 21, wherein the housing has opposite ends to which the support structures are attached.

23. The heat exchanger of claim 22, wherein the support structures comprises end caps which seal the ends of the housing.

24. The heat exchanger of claim 21, further comprising an electrically conductive plate which is in electrical contact with one end of each of the electrodes and through which the voltage is applied to the electrodes, wherein the electrically conductive plate is attached to one of the support structures.

25. The heat exchanger of claim 20, wherein said support structures are located between opposite ends of the electrodes and maintain spacing between the electrodes and the at least one heat exchange surface.

26. The heat exchanger of claim 14, wherein the voltage is from about 1 to 30 kV.

27. The heat exchanger of claim 14, wherein the voltage is pulsed.

* * * * *

UNITED STATES PATENT AND TRADEMARK OFFICE
CERTIFICATE OF CORRECTION

PATENT NO.        : 7,398,643 B2                                                                 Page 1 of 1
APPLICATION NO. : 11/383552
DATED             : July 15, 2008
INVENTOR(S)       : James S. Cotton It is certified that error appears in the above-identified patent and that said Letters Patent is hereby corrected as shown below:

Column 10:
line 17, "least one" (second occurrence) should be deleted.

Column 12:
line 5, "first second" should read --first and second--;
line 5, "outlets" should read --outlet--;
line 16, "one the" should read --one of the--;
line 36, "comprises" should read --comprise--.

Signed and Sealed this

Sixteenth Day of December, 2008

JON W. DUDAS
*Director of the United States Patent and Trademark Office*